July 28, 1931. R. F. MARRON 1,816,687
WHEEL SECURING MEANS
Filed Nov. 5, 1929
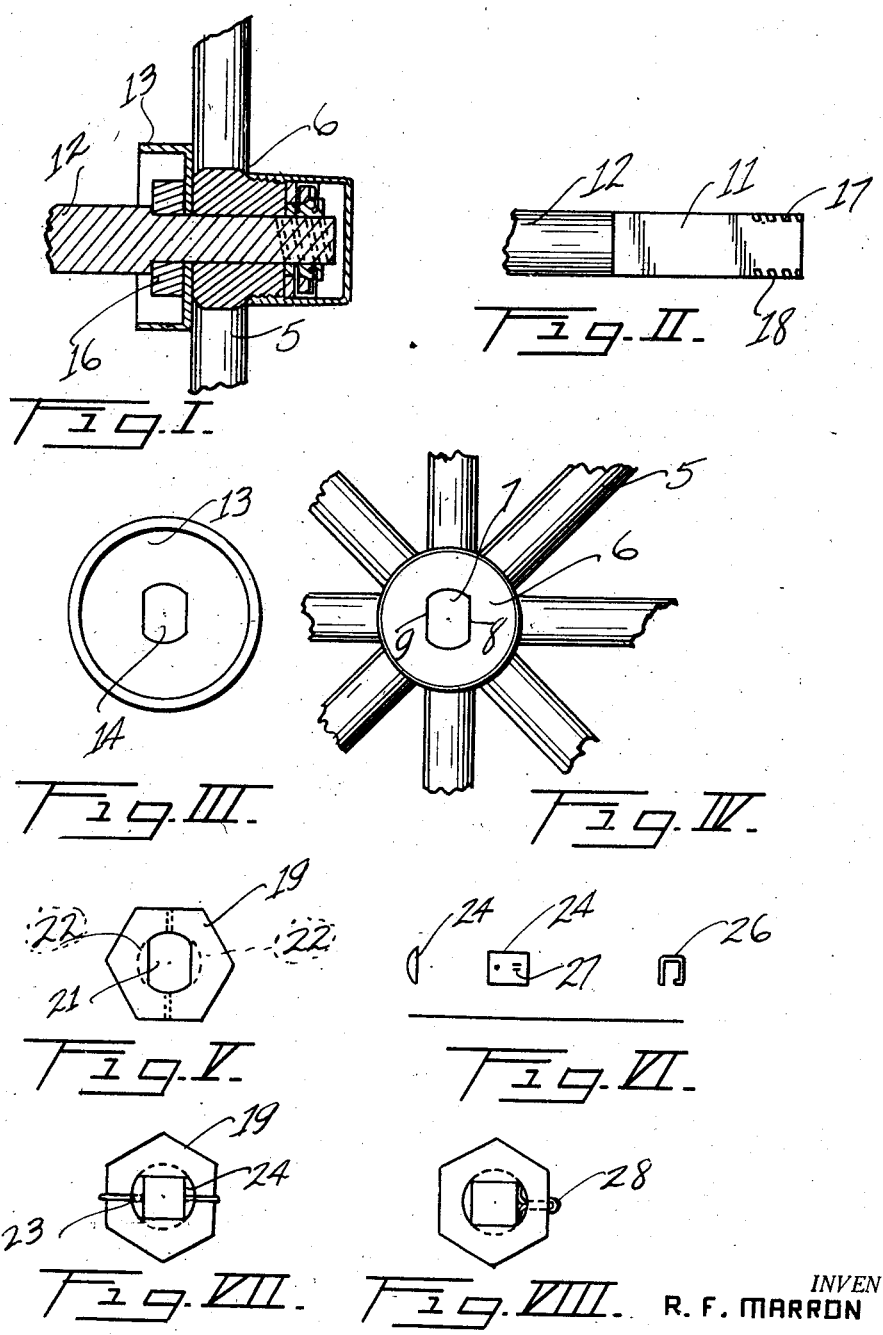
INVENTOR.
R. F. MARRON
BY Victor J. Evans
ATTORNEYS.

Patented July 28, 1931

1,816,687

UNITED STATES PATENT OFFICE

RICHARD F. MARRON, OF LOS ANGELES, CALIFORNIA, ASSIGNOR OF ONE-THIRD TO L. O. CLINE, OF LOS ANGELES, CALIFORNIA

WHEEL SECURING MEANS

Application filed November 5, 1929. Serial No. 405,013.

This invention relates to improvements in wheel securing means.

The principal object of this invention is to provide simple means whereby a wheel may be detachably secured to the axle of a motor vehicle in such a manner that it will be permanently secured thereon until it is desired to remove the same.

A further object is to provide means whereby the wheel is securely locked against accidental loosening.

Other objects and advantages will be apparent during the course of the following description.

In the accompanying drawings forming a part of this specification and in which like numerals are employed to designate like parts throughout the same, Figure 1 is a fragmentary cross section of a vehicle wheel, hub and axle having my invention applied thereto, Figure 2 is a fragmentary view showing in elevation the end of an axle constructed in accordance with my invention, Figure 3 is a side elevation of the brake drum showing the shape of the opening therethrough, Figure 4 is a fragmentary detail view showing the hub of the wheel in elevation and my peculiar form of opening therethrough, Figure 5 is a side elevation of my locking nut, Figure 6 discloses detail views of the locking edge and clip, Figure 7 is a view similar to Figure 5, showing the locking nut turned to locking position and the clip and wedge in place, and Figure 8 is a modified form of locking means wherein a cotter-pin is employed in place of the wedge and clip.

In securing vehicle wheels to the axle of the vehicle, it is essential that the same be securely held upon the axle both against rotation and accidental removal. Applicant has therefore devised a simple means whereby the entire wheel structure may be slipped upon the axle and a mutilated nut slipped on the axle and given a quarter turn in one direction, which serves to lock the wheel upon the axle. A wedge and clip or a split cotter pin may be employed for preventing retrograde movement of the locking nut.

In the accompanying drawings wherein for the purpose of illustration is shown a preferred embodiment of my invention, the numeral 5 designates a wheel having the customary hub 6. This hub is provided with an opening 7 therethrough, which opening instead of being circular in form has flat sides 8 and 9. These flat sides are adapted to contact the flat sides of the axle 12 which prevents turning of the hub in respect to the axle. The brake drum 13 is also provided with an opening 14 and is the same shape as the opening 7. A spacer 16 may be employed on the inside of the brake drum as illustrated in Figure 4, if desired. The wheel and hub thus far described are slipped upon the end of the axle shown in Figure 2, which axle has threads 17 and 18 formed thereon. A locking nut 19 is now slipped upon the end of the axle. This locking nut is best illustrated in Figure 5, where it will be noted that the opening 21 therethrough has the same shape as the openings 7 and 14, previously described. The nut 19, however, has threads 22 formed upon the flat interior sides of the nut. This results in it being possible for the nut to be slipped upon the end of the axle and given a partial rotation, the same resulting in locking the hub against endwise movement with respect to the axle.

In order to prevent retrograde movement of the nut 19, I employ wedges 23 and 24. These wedges fill the space between the flat side of the axle and the curved interior surface of the nut. In order to retain these wedges in place, I provide clips 26 which clips have two legs, one of which extends through an opening in the nut 19 and the other extends through an opening 27 in the wedge. This opening 27 is preferably elongated so that the leg of the clip may be bent and caught therein. In the modified form shown in Figure 8 the wedges are eliminated and a cotter pin 28 is inserted through the hole 29 formed in the nut 19.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, an axle having its end portion provided with flat surfaces for the purpose of retaining a hub thereon, said hub being provided with flat surfaces adapted to cooperate with the flat surfaces of said axle for the purpose of preventing rotation of either part with relation to the other, a nut having an opening therethrough of the same cross sectional shape as the cross sectional shape of said axle at the point where the flat sides are provided, threads formed on said axle and threads formed on said nut, and means for preventing rotation of said nut with respect to said axle, said means comprising segmental wedges positioned between said nut and the flat portion of said axle and U-shaped clips adapted to engage said nut and said wedges for the purpose of preventing said wedges from being displaced, said clips having two legs, one of which extends through said nut and one of said wedges, the other of said legs engaging the outer surface of said nut and one of the wedges.

In testimony whereof I affix my signature.

RICHARD F. MARRON.